US009941522B2

(12) United States Patent
Cosnier et al.

(10) Patent No.: US 9,941,522 B2
(45) Date of Patent: Apr. 10, 2018

(54) BIOCOMPATIBLE ELECTROCHEMICAL SUPERCAPACITOR

(71) Applicants: Centre National de la Recherche Scientifique, Paris (FR); Universite Joseph Fourier, Grenoble (FR)

(72) Inventors: Serge Cosnier, Crolles (FR); Michael Holzinger, Grenoble (FR); Alan Le Goff, Laval (FR); Charles Agnes, Grenoble (FR)

(73) Assignee: Universite Joseph Fourier, Grenoble (FR)

( * ) Notice: Subject to any disclaimer, the term of this patent is extended or adjusted under 35 U.S.C. 154(b) by 380 days.

(21) Appl. No.: 14/772,744

(22) PCT Filed: Mar. 4, 2014

(86) PCT No.: PCT/FR2014/050482
§ 371 (c)(1),
(2) Date: Sep. 3, 2015

(87) PCT Pub. No.: WO2014/135787
PCT Pub. Date: Sep. 12, 2014

(65) Prior Publication Data
US 2016/0006039 A1 Jan. 7, 2016

(30) Foreign Application Priority Data
Mar. 7, 2013 (FR) .................... 13 52046

(51) Int. Cl.
*H01M 8/16* (2006.01)
*H01G 11/36* (2013.01)
(Continued)

(52) U.S. Cl.
CPC .......... *H01M 4/9008* (2013.01); *H01G 11/36* (2013.01); *H01G 11/62* (2013.01);
(Continued)

(58) Field of Classification Search
CPC ........ H01G 11/36; H01G 11/62; H01G 11/76; H01G 11/86; H01M 8/16; H01M 12/00; H01M 2250/30; Y02B 90/18; Y02E 60/13
(Continued)

(56) References Cited

U.S. PATENT DOCUMENTS

2008/0160384 A1 7/2008 Iqbal et al.
2011/0165321 A1* 7/2011 Zhamu .................. B82Y 30/00
427/79

FOREIGN PATENT DOCUMENTS

CN 101 573 816 A 11/2009
EP 2 375 481 A1 10/2011
(Continued)

OTHER PUBLICATIONS

Zebda et al., Mediatorless high-power glucose biofuel cells based on compressed carbon nanotube-enzyme electrodes. Nature Communications. Jun. 2011;1-6.
(Continued)

*Primary Examiner* — Jenny L Wagner
*Assistant Examiner* — Michael P McFadden
(74) *Attorney, Agent, or Firm* — Wolf, Greenfield & Sacks, P.C.

(57) ABSTRACT

A supercapacitor to be submerged in a medium containing a biological material and an oxidant, wherein the anode comprises a first enzyme that can catalyse the oxidation of the biological material and the cathode comprises a second enzyme that can catalyse the reduction of the oxidant, and wherein each of the anode and cathode electrodes consists of a solid agglomerate of a conductive material mixed with the first or the second enzyme, said agglomerate having a specific surface that is larger than or equal to 20 m²/g and an average pore size varying between 0.7 nm and 10 pm.

12 Claims, 2 Drawing Sheets

(51) Int. Cl.
  *H01G 11/62* (2013.01)
  *H01M 4/90* (2006.01)
  *H01G 11/76* (2013.01)
  *H01G 11/86* (2013.01)
  *H01M 12/00* (2006.01)

(52) U.S. Cl.
  CPC ............ *H01G 11/76* (2013.01); *H01G 11/86* (2013.01); *H01M 8/16* (2013.01); *H01M 12/00* (2013.01); *H01M 2250/30* (2013.01); *Y02B 90/18* (2013.01); *Y02E 60/13* (2013.01)

(58) Field of Classification Search
  USPC ........................................................ 361/502
  See application file for complete search history.

(56) References Cited

FOREIGN PATENT DOCUMENTS

| | | |
|---|---|---|
| JP | 2009-515303 A | 4/2009 |
| JP | 2010-534384 A | 11/2010 |
| JP | 2011-517039 A | 5/2011 |

OTHER PUBLICATIONS

International Search Report from corresponding International Application No. PCT/FR2014/050482 dated Jun. 12, 2014.
Written Opinion, dated Jun. 12, 2014, from corresponding International Application No. PCT/FR2014/050482.
Japanese Office Action dated Nov. 21, 2017 for Application No. 2015-560745.

* cited by examiner ation PCT/FR2014/
BIOCOMPATIBLE ELECTROCHEMICAL SUPERCAPACITOR

CROSS-REFERENCE TO RELATED APPLICATIONS

This application is a national stage filing under 35 U.S.C. § 371 of International PCT Application PCT/FR2014/050482, filed Mar. 4, 2014, entitled "BIOCOMPATIBLE ELECTROCHEMICAL SUPERCAPACITOR," which claims priority to French Application No. 13/52046, filed Mar. 7, 2013, each of which applications are incorporated herein by reference to the maximum extent allowable by law.

BACKGROUND

The present invention relates to electrochemical supercapacitors.

DISCUSSION OF THE RELATED ART

A supercapacitor is a capacitor which enables to obtain a power mass density and an energy mass density intermediate between conventional batteries and electrolytic capacitors. Generally, the power mass density of a supercapacitor is in the range from 1,000 to 5,000 W/kg, while the power mass density of an electrolytic capacitor is greater than 100,000 W/kg and the power mass density of a battery is smaller than 150 W/kg, and the energy mass density of a supercapacitor is in the range from 0.5 to 30 Wh/kg, while the energy mass density of an electrolytic capacitor is smaller than 0.1 Wh/kg and the energy mass density of a battery is greater than 50 Wh/kg. Supercapacitors thus enable to store a quantity of energy intermediate between conventional electrolytic capacitors and batteries while restoring this energy faster than a battery.

Most currently commercialized supercapacitors are formed according to a double-layer electrochemical structure. Such supercapacitors are generally called EDLC (Electrochemical Double Layer Capacitor).

An EDLC-type supercapacitor is formed of two porous electrodes, generally made of activated carbon. Such electrodes are impregnated with an electrolyte and are separated by an insulating and porous membrane to allow ion conduction. Two layers of charges of opposite signs form at each electrode-electrolyte interface. A supercapacitor can thus be schematically shown as the series association of two capacitors, one at the positive electrode, the cathode, and the other one at the negative electrode, the anode.

Currently commercialized supercapacitors are electrochemically charged by an external electrical energy source. When the supercapacitor is discharged, it should thus be connected to the external electrical energy source to be recharged.

For certain applications, it would be desirable to have a supercapacitor which can be recharged without having to be connected to an external electrical energy source. An example of application is the use of the supercapacitor to power various actuators, such as pacemakers, artificial sphincters, or even artificial hearts. The supercapacitor should thus be able to be implanted in a living being, animal or human, and to operate without having to be recharged by an external electrical energy source.

SUMMARY

An object of an embodiment is to provide a supercapacitor which overcomes all or part of the disadvantages of usual supercapacitors.

According to another object of an embodiment, the supercapacitor can recharge without having to be connected to an external electrical energy source.

According to another object of an embodiment, the supercapacitor is simple to handle.

According to another object of an embodiment, the supercapacitor is implantable in a living being, animal or human.

To achieve all or part of these and other objects, a supercapacitor intended to be immersed in a medium containing a biological material and an oxidizer is provided, wherein the anode comprises a first enzyme capable of catalyzing the oxidation of the biological material and the cathode comprises a second enzyme capable of catalyzing the reduction of the oxidizer, and wherein each of the anode and cathode electrodes is formed of a solid cluster of a conductive material mixed with the first or with the second enzyme, said cluster having a specific surface area greater than or equal to 20 m2/g and an average pore size ranging from 0.7 nm to 10 μm.

According to an embodiment, the conductive material is selected from the group comprising carbon nanotubes, graphene sheets, and a mixture thereof.

According to an embodiment, the biological material is a sugar and the first enzyme is selected from the group comprising the glucose oxidase enzyme, the lactose oxidase enzyme, the galactose oxidase enzyme, the fructose oxidase enzyme, the glucose dehydrogenase enzyme, and a mixture thereof.

According to an embodiment, the second enzyme is selected from the group comprising the polyphenol oxidase enzyme (PPO), the laccase enzyme, the bilirubin oxidase enzyme, and a mixture thereof.

According to an embodiment, the anode further comprises a first redox mediator capable of exchanging electrons with the first enzyme.

According to an embodiment, the first mediator is selected from the group comprising ubiquinone, ferrocene, cobaltocene, N-methyl phenothiazine, 8-hydroxyquinoline-5-sulfonic acid hydrate (HQS), and a mixture thereof.

According to an embodiment, the cathode further comprises a second redox mediator capable of exchanging electrons with the second enzyme.

According to an embodiment, the second mediator is selected from the group comprising quinone, ABTS, osmocene, ruthenocene, cobalt(II) tetraphenylporphyrin, zinc phtalo-cyanine, and a mixture thereof.

According to an embodiment, each cluster of the anode and of the cathode is attached to an electrode wire.

According to an embodiment, the anode and cathode electrodes are each surrounded with a semipermeable membrane which lets through the oxidizer and the biological material and which does not let through the first and second enzymes.

According to an embodiment, the anode and cathode electrodes are altogether surrounded with a semipermeable membrane which lets through the biological material and the oxidizer and which does not let through the first and second enzymes.

A method of manufacturing a supercapacitor is also provided, wherein the anode and the cathode are formed by compression of a dissolved mixture comprising a conductive material associated with a first or a second enzyme to form a solid cluster of the conductive material mixed with the first or with the second enzyme, said cluster having a specific surface area greater than or equal to 20 m2/g and an average pore size ranging from 0.7 nm to 10 μm.

BRIEF DESCRIPTION OF THE DRAWINGS

The foregoing and other features and advantages of the present invention will be discussed in detail in the following non-limiting description of specific embodiments in connection with the accompanying drawings, among which.

DETAILED DESCRIPTION

Figure 1:
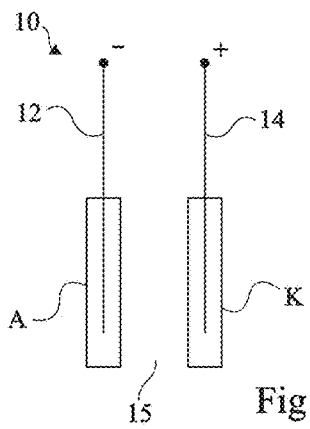
FIG. 1 very schematically shows an embodiment of a supercapacitor with solid electrodes.

The same elements have been designated with the same reference numerals in the different drawings. For clarity, only those steps and elements which are useful to the understanding of the described embodiments have been shown and are detailed. In particular, the device for holding the electrodes with respect to each other is not described in detail. In the following description, unless otherwise indicated, terms "substantially", "approximately", and "in the order of" mean "to within 10%".

The present invention relates to a supercapacitor having its charge obtained by conversion into electricity of part of the energy available in a biodegradable substrate.

FIG. 1 shows an embodiment of a supercapacitor 10 comprising an anode body A and a cathode body K. Anode body A is formed of a solid body comprising a conductive material associated with an appropriate anode enzyme and an optional redox mediator. Anode body A is attached to an anode wire 12. Similarly, cathode body K is formed of a solid body formed of a conductor associated with an appropriate enzyme and optional redox cathode mediator. Cathode body K is attached to a cathode wire 14. Anode and cathode wires 12, 14, for example, made of platinum, are shown as penetrating into the anode and cathode bodies. As a variation, they may be simply glued to these bodies. When an external electrical circuit should be powered by supercapacitor 10, the circuit is connected to the ends of wires 12 and 14.

Anode body A and cathode body K each have:
an average pore size in the range from 0.7 nm to 10 μm, preferably in the range from 2 nm to 50 nm; and
a specific surface area greater than or equal to 20 m2/g, preferably greater than or equal to 400 m2/g and/or an open porosity in the range from 20 m2/g to 8,000 m2/g, preferably in the range from 100 m2/g to 2,000 m2/g.

The average pore size may be measured by electronic scan microscopy (ESM), by electronic transmission microscopy, by impedance spectroscopy, as particularly described in publication Electrochimica Acta, volume 44 (1999), pages 3513-3519, or by the BET method. The BET method, or Brunauer, Emmett, and Teller method, comprises estimating the specific surface area, the porous volume, and the pore size based on the quantity of nitrogen adsorbed by physisorption.

The specific surface area may be measured by cyclic voltamperometry as described, in particular, in work "Electrochemical Methods: Fundamentals and Applications" of A. J. Bard and L. R. Faukner (John Wiley and Sons, New York, 2000), or by the BET method. The open porosity may be measured by the BET method.

The conductive material forming anode body A and cathode body K has a conductivity greater than or equal to 10 S/m, preferably greater than or equal to 1,000 S/m. The conductive material for example corresponds to carbon nanotubes, to graphene sheets, or to a mixture thereof. Term carbon nanotube is used to designate a hollow carbon tube having an internal diameter ranging from 0.7 nm to 2 nm and having a length ranging from a few hundreds of nanometers to several millimeters. It may comprise a single layer of carbon atoms or a plurality of layers of carbon atoms. Preferably, the solid fraction of anode body A or of cathode body K comprises more than 90% by mass of carbon, more preferably more than 95% by mass of carbon.

In operation, anode body A and cathode body K are placed in a medium 15 containing an electrolyte. It may be an aqueous solution, an organic solvent, a gel, a paste, a polymer, etc. Preferably, medium 15 corresponds to a biological solution. Preferably, anode body A is brought as close as possible to cathode body K. However, anode body A is maintained at a distance from cathode body K so that no short-circuit forms between anode body A and cathode body K. According to an example, a sufficient electrolyte thickness is maintained between anode body A and cathode body K. According to another example, a porous membrane, made of a material which is an electric insulator but enables ions to flow, may be interposed between anode body A and cathode body K. The porous membrane may be impregnated with the electrolyte.

Figure 2:
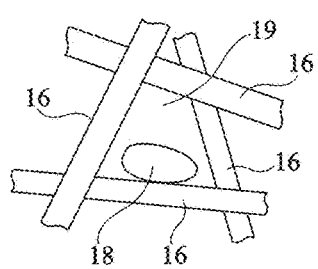
FIG. 2 is a simplified enlarged view of the anode or of the cathode of the supercapacitor of FIG. 1.

FIG. 2 is an enlarged simplified view of an embodiment of the anode body or of the cathode body. According to this embodiment, the anode body or the cathode body comprises an entanglement or cluster of carbon nanotubes and/or of graphene sheets 16 having enzymes 18 dispersed therein, a single enzyme being shown in FIG. 2. At least certain enzymes are in contact with the nanotubes or graphene sheets 16. Carbon nanotube and/or graphene sheet entanglement 16 forms open pores 19 which allow the diffusion of the electrolyte into anode body A or cathode body K.

The carbon nanotube or the graphene sheets may be at last partially covered with a conductive polymer such as polyaniline, polypropylene, polyvinylidene fluoride, polypyrrole, or polythiophene. Further, a treatment of oxidation or of amination of the carbon nanotubes or of the graphene sheets may be carried out, for example, by electrochemical polarization or by exposure to an oxygen or ammonia plasma. Further, electroactive particles based on transition metals may be inserted into the matrix of carbonaceous materials. These may for example be ruthenium oxide particles ($RuO_2$), titanium oxide particles ($TiO_2$), chromium oxide particles (Cr2O3), manganese oxide particles (MnO2), cobalt oxide particles (Co2O3), or a mixture of these particles.

An enzyme is a protein which behaves as a biological catalyst (or biocatalyst), that is, as a compound which eases a biochemical reaction without modifying the products thereof. At least one of the enzymes present at the anode or at the cathode eases a biochemical reaction, which results in the provision of electrons from a biological fuel.

According to an example, the enzyme present in anode body A is capable of catalyzing the oxidation of sugar and is, for example, selected from the group comprising the glucose oxidase enzyme (GOD) if the sugar is D-glucose, or D-glucose stereoisomer, the L-fucose dehydrogenase enzyme if the sugar is L-glucose, or L-glucose stereoisomer, the lactose oxidase enzyme if the sugar is lactose, the galactose oxidase enzyme if the sugar is galactose, and a mixture of these enzymes. An advantage of the use of the glucose oxidase enzyme is that the electrolyte may directly correspond to a biological solution which naturally contains D-glucose, which is the glucose taking part in glycaemia. According to another example, the enzyme present in the anode body comprises an enzyme selected from the dehydrogenase group in association with diaphorase, for example, glucose dehydrogenase, which oxidizes glucose and reduces NAD+ into NADH. NAD+ and NADH respectively correspond to the oxidized and reduced form of nicotinamide adenine dinucleotide. The diaphorase oxidizes NADH into NAD+ and transfers, directly or via a redox mediator, the electrons to the anode.

As an example, the enzyme present in cathode body K is capable of catalyzing the reduction of oxygen and is, for example, selected from the group comprising the polyphenol oxidase enzyme (PPO), the laccase enzyme, the bilirubin oxidase enzyme, the ascorbate oxidase enzyme, and a mixture of these enzymes.

The anode and cathode bodies may be implanted inside a plant, animal, or human body, since many locations in the body contain fluids containing glucose and oxygen.

As an example, calling GODox and GODred, respectively, the oxidized and reduced form of the glucose oxidase enzyme, the following reactions can be observed at the anode:

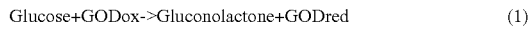

Glucose+GODox->Gluconolactone+GODred  (1)

GODred->GODox+2e−  (2)

Reaction (2) reflects the electron transfer towards the conductive carbonaceous material of anode body A.

The glucose oxidase enzyme may further cause the forming of hydrogen peroxide from dioxygen. Hydrogen peroxide, which may be toxic, may if necessary be degraded by the catalase enzyme. This enables to regenerate dioxygen, thus protecting the organism from potentially toxic effects of hydrogen peroxide in the case where the supercapacitor is implanted in an animal or human body.

As an example, calling LACox and LACred, respectively, the oxidized and reduced form of the laccase enzyme, the following reactions can be observed at the cathode:

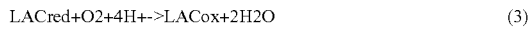

LACred+O2+4H+->LACox+2H2O  (3)

LACox+4e−->LACred  (4)

Reaction (4) reflects the retrieval of electrons from the conductive carbonaceous material of cathode body K.

According to another embodiment, anode body A further comprises a redox mediator. The redox mediator has a low redox potential, however greater than the redox potential of the enzyme present at the anode. It is capable of exchanging electrons with the enzyme present at the anode and is, for example, selected from the group comprising quinone derivatives, particularly ubiquinone (UQ), or 8-hydroxyquinoline-5-sulfonic acid hydrate (HQS), metal-organic complexes, particularly ferrocene or cobaltocene, N-methyl phenothiazine redox dyes, and a mixture of these mediators.

As an example, calling Med1ox and Med1red respectively the oxidized form and the reduced form of the redox mediator present in anode body A, the following reactions can be observed at the anode:

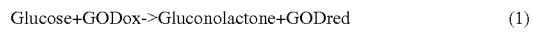

Glucose+GODox->Gluconolactone+GODred  (1)

GODred+Med1ox->GODox+Med1red  (5)

Med1red->Med1ox+2e−  (6)

Reaction (6) reflects the electron transfer towards the conductive carbonaceous material of anode body A.

According to another embodiment, cathode body K further comprises a redox mediator. The redox mediator has a high redox potential, however smaller than the redox potential of the enzyme present at the cathode. It is capable of exchanging electrons with the cathode enzyme and is for example selected from the group comprising hydroquinone (QHD), 2,2'-azinobis-(3-ethylbenzothiazoline-6-sulfonic acid) (ABTS), osmocene, ruthenocene, cobalt(II) tetraphenylporphyrin, zinc phtalo-cyanine, tetrathiafulvalene (TTF), phenanthrenequinone, and a mixture of these mediators.

As an example, calling Med2ox and Med2red respectively the oxidized form and the reduced form of the redox mediator present in cathode body K, the following reactions can be observed at the cathode:

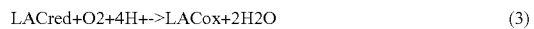

LACred+O2+4H+->LACox+2H2O  (3)

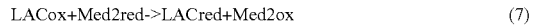

LACox+Med2red->LACred+Med2ox  (7)

Med2ox+4e−->Med2red  (8)

Reaction (8) reflects the retrieval of electrons from the conductive carbonaceous material of cathode body K, the number of electrons involved in reaction (8) actually depending on the type of redox mediator used.

The previously-indicated reactions permanently take place at the electrodes when no potential or no current is applied to the electrodes, as long as the biological fuel, for example, glucose, is present at the cathode and the inorganic fuel, for example, oxygen, is present at the anode and as long as the carbonaceous material can receive or provide electrons. In the absence of potential or of current imposed to the electrodes, an accumulation of negative charges can thus be observed in the conductive carbonaceous material forming anode body A and a migration of positive ions to the anode, for example, hydronium ions present in the electrolyte, these ions accumulating at the surface of the anode body. An accumulation of positive charges in the carbonaceous material forming cathode body K and a migration of negative ions towards the cathode, for example, hydroxyl ions present in the electrolyte, these ions accumulating at the surface of the cathode body, can further be observed. The charge of the supercapacitor stops when the carbonaceous material can no longer accept electric charges.

The supercapacitor is thus self-rechargeable since the recharge of the supercapacitor does not require connecting the supercapacitor to an external electrical energy source.

The previously-indicated reactions have already been described in the case of biological fuel cells, for example, in document US 2011/0250510. However, in the case of biological fuel cells, the previous oxidation and reduction reactions only occur when a load is connected across the biological fuel cell. Indeed, in the present embodiment, the inventors have shown that when the conductive material which forms the anode and cathode bodies have specific properties of average pore size, specific surface area, and conductivity, a phenomenon of charge storage at the level of anode body A and of cathode body K in the presence of the enzymes, possibly of the redox mediators, of the biological fuel, and of the electrolyte, can be observed.

Indeed, the carbonaceous material forming the anode body and the cathode body has an average pore size allowing the passing of the electrolyte, of the biological fuel, and possibly of the redox mediators. This material further has a significant specific surface area, that is, a large surface area of exchange between the carbonaceous material and the electrolyte, which enables to store a significant number of charges. Further, this material has a high electric conductivity, which enables to obtain a high specific power. Finally, it is a material stable during a use in a physiological medium.

The inventors have shown that when the material forming the anode body or the cathode body does not have the previously-indicated properties of specific surface area and average pore size, the charge storage phenomenon is not present or is only negligibly present and does not enable to use the device, either as a capacitor, or as a supercapacitor.

Figure 3:
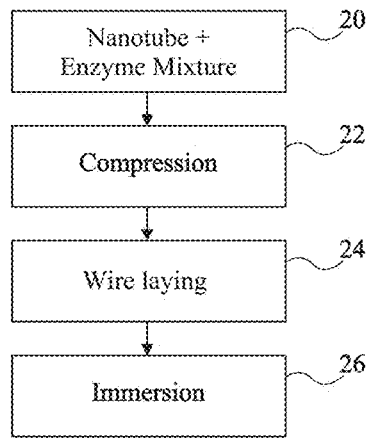
FIG. 3 shows in the form of a block diagram an embodiment of a method of manufacturing the supercapacitor of FIG. 1.

FIG. 3 shows, in the form of a block diagram, an embodiment of a method of manufacturing an electrode of supercapacitor 10 of FIG. 1. The method comprises successive steps 20, 22, 24, and 26.

At step 20, the material forming anode body A or electrode body K is mixed with the appropriate enzymes and possibly with the appropriate redox mediator.

At step 22, the mixture obtained at the previous step is compressed at a pressure greater than or equal to 500 kg/cm2, preferably greater than 1,000 kg/cm2 to obtain the desired final shape of anode body A or of cathode body K. As an example, anode body A and/or cathode body K may have the shape of a cylinder of circular cross-section.

At step 24, conductive wire 12 is attached to anode body A and conductive wire 14 is attached to cathode body K. As an example, wires 12, 14 are attached to anode body A and to cathode body K by conductive carbon glue and covered with a silicon film to reinforce the mechanical strength of the connection and the electric contact. According to another embodiment, steps 22 and 24 are confounded. Each wire 12, 14 is then placed in the mixture obtained at step 20 and the holding of wire 12, 14 in the anode body or the cathode body is obtained at the compression of the carbonaceous material around the wire.

At step 26, anode body A and cathode body K are impregnated with medium 15 comprising the electrolyte and the biological fuel. As an example, anode body A and cathode body K are immersed in medium 15.

Figure 4:
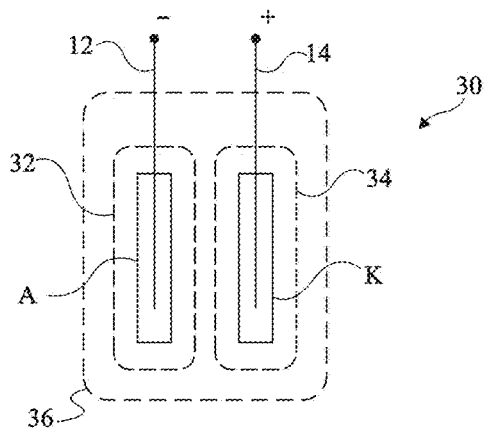
FIG. 4 very schematically shows another embodiment of a supercapacitor.

FIG. 4 shows another embodiment of a supercapacitor 30 where each of the anode and cathode bodies A and K is surrounded with a microperforated membrane, respectively 32, 34, such as membranes currently used in dialysis, which lets through the biological fuel, for example, glucose and oxygen, and prevents the passing of the enzyme and of the redox mediator of greater molecular weight. Membranes 32, 34 advantageously enable to decrease, or even to suppress, risks of leakage out of the anode body and of the cathode body of the redox material and/or of the enzyme along time. Further, the anode and cathode electrode assembly may be surrounded by a semipermeable membrane 36 letting through the biological fuel, for example, glucose and oxygen, and blocking enzymes and redox mediators, especially to avoid for the anode and cathode membranes 32, 34 to clog, especially in case of an implantation in an animal or human body.

The following tests have been carried out. An anode has been prepared by mixing 200 mg of carbon nanotubes commercialized by Nanocyl under name Multi-Walled Carbon nanotubes NC3100, 60 mg of the glucose oxidase enzyme, commercialized by Sigma-Aldrich under name G2133, 60 mg of the catalase enzyme, commercialized by Sigma-Aldrich under name C40, and 1 ml of water in a ceramic mortar. A cathode has been similarly prepared by mixing 200 mg of carbon nanotubes, 70 mg of the laccase enzyme, commercialized by Sigma-Aldrich under name 51639, and 1 ml of water in a ceramic mortar. The resulting nanotube-enzyme pastes have been compressed at a 1,000-kg/cm2 pressure (98.7 MPa) to form cylinders. The surface area and the thickness of the cylinders respectively are 1.33 cm2 and 0.1 cm. A platinum wire has been attached with conductive glue to the carbon on one side of each disk and covered with a silicon film. The specific surface area, measured by the BET method, of the carbon nanotube cylinders is in the range from 250 to 300 m2/g and the average pore size is 13 nm.

To operate as a supercapacitor, the anode and cathode bodies have been arranged in a solution containing oxygen and a sugar, for example, glucose. Anode and cathode bodies A and K have been maintained in the solution, a circular surface of anode body A being arranged opposite a circular surface of cathode body K. A layer of the solution is present between these two opposite surfaces. In the tests described hereafter, the solution is a buffer solution having a molar concentration of phosphate at 0.2 mol/l, a pH equal to 7, and a molar glucose concentration of 0.2 mol/l. The solution has been left in contact with the ambient air.

Figure 5:
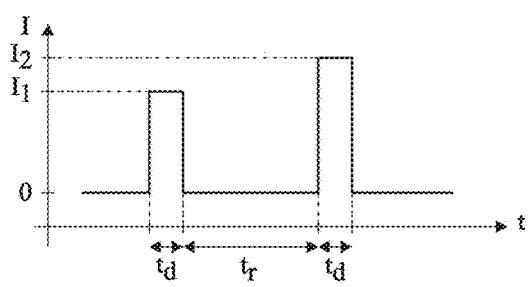
FIG. 5 illustrates an example of charge and discharge cycles of the supercapacitor.

FIG. 5 illustrates the protocol for achieving the tests having their results illustrated in FIGS. 6 to 9. A succession of cycles has been carried out, each cycle successively comprising a charge phase of duration tr during which supercapacitor 10 is in open circuit and a discharge phase of duration td during which supercapacitor 10 is connected to an electronic circuit. The circuit comprises a current limiter of adjustable level, so that, during each discharge phase of duration td, the current supplied by the supercapacitor is set to a known value which may be different from one discharge phase to the other.

Figure 6:
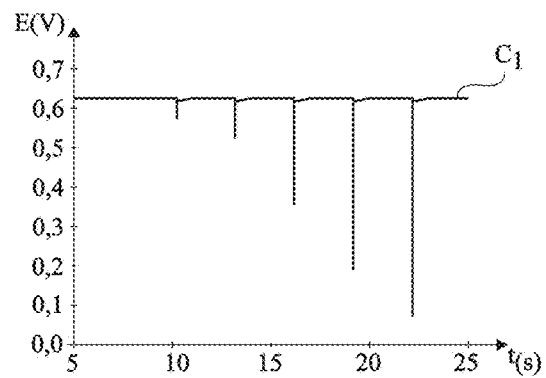
FIG. 6 shows the curve of time variation of the voltage across the supercapacitor of FIG. 1 on implementation of the charge and discharge cycles of FIG. 5.
Figure 7:
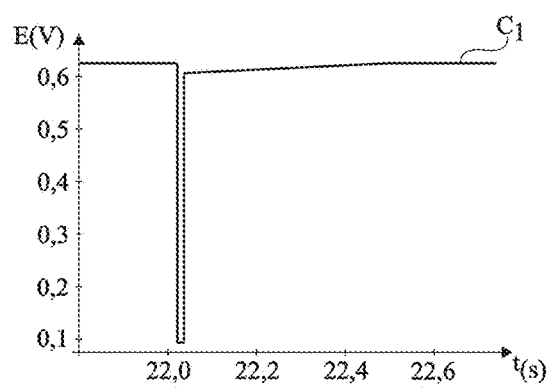
FIG. 7 is an enlarged view of a portion of the variation curve of FIG. 6.

FIG. 6 shows a curve C1 of variation of voltage E across the supercapacitor along time during five successive cycles. FIG. 7 is an enlarged view of FIG. 6 for one of the cycles. Duration td is equal to 10 ms and duration tr is equal to 10 s. In FIG. 6, the discharge phases have been carried out at currents of different intensities successively equal to 1 mA, 2 mA, 5 mA, 8 mA, and 10 mA. The space between electrodes is 1 cm.

Discharge currents up to more than 10 mA have been observed. A voltage drop across the supercapacitor has been observed during a discharge phase. Between two discharge phases, the voltage across the supercapacitor has stabilized at a substantially constant voltage, which corresponds to the open circuit capacitor voltage. In the present test, the open circuit voltage is substantially 0.63 V.

A comparative test has been made with a same device formed identically, but for the fact that the carbon nanotubes have been replaced with graphite pellets having an average diameter of 1 cm. The obtained device then only operates as a fuel cell for which the open-circuit voltage is substantially imposed by the potentials of the redox couples present. In the comparative test, a potential difference at a zero current substantially equal to the difference of the redox potentials of the redox couples present at the anode and at the cathode has been obtained. There is thus no charge storage effect in the anode and cathode bodies.

Figure 8:
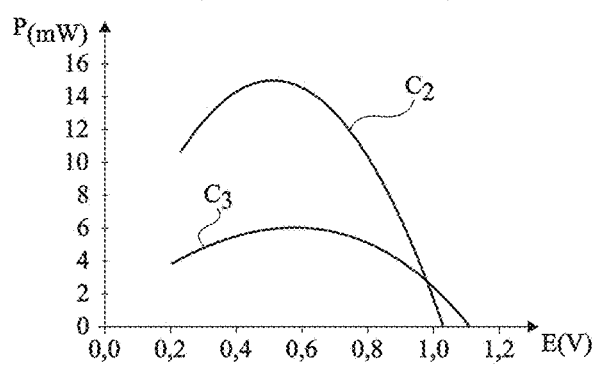
FIG. 8 shows two curves of the variation of the power supplied by the supercapacitor according to the voltage across the supercapacitor for two embodiments of supercapacitors.

FIG. 8 shows two curves C2 and C3 of the variation of power P supplied by the supercapacitor according to voltage E for two embodiments of supercapacitors. Curve C2 has been obtained for a supercapacitor having its anode and cathode bodies distant by approximately 1 cm and curve C3 has been obtained for a supercapacitor having its anode and cathode bodies distant by approximately 3 cm. Curves C2 and C3 show that the obtained powers are all the higher as the distance between the anode and cathode bodies is small. The maximum power for curve C2 is approximately 15 mW and corresponds to a current of 30-mA intensity and to a voltage E of approximately 0.5 V.

Figure 9:
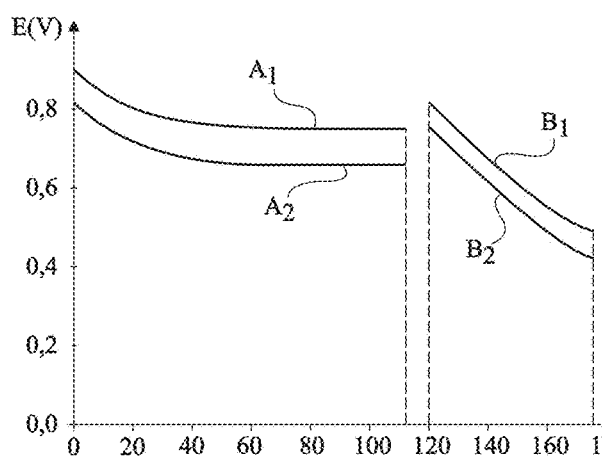
FIG. 9 shows a curve of the variation of the voltage across the supercapacitor on addition of biodegradable fuel and when no biodegradable fuel is added.

FIG. 9 shows curves of the variation of the voltage across the supercapacitor on addition of glucose and when no glucose is added. More specifically, curves A1 and A2 respectively show the upper envelope and the lower envelope between which voltage E across the supercapacitor varies for a succession of 40,000 charge and discharge cycles while the anode and cathode bodies are in a solution containing glucose. Curves B1 and B2 respectively show the upper envelope and the lower envelope between which voltage E across the supercapacitor varies for a succession of 20,000 charge and discharge cycles while the anode and cathode bodies are introduced in a solution containing no glucose. The inorganic fuel, that is, oxygen in this test, is present so that the previously-described reactions occur at the cathode. During the first part of the experiment (first 40,000 cycles), the anode and cathode bodies are separated by 2 cm and during the second part of the experiment, in the absence of glucose (last 20,000 cycles), the anode and cathode bodies are separated by 1 cm. For each charge and discharge cycle, duration td of a discharge phase is 10 ms, duration tr of a charge phase is 10 s, and the discharge current is 3 mA. Curves A1 and B1 show the variation of the open circuit voltage of the supercapacitor while curves A1 and B1 show the variation of the voltage across the supercapacitor for each discharge peak.

Curves A1 and A2 show that, in the presence of glucose, a balance is obtained between the charge and discharge phases, which results in a stabilization of the open circuit voltage. Curves B1 and B2 show that, in the absence of glucose, the supercapacitor has continuously discharged along the discharge cycles.

Various embodiments with different variations have been described hereabove. It should be noted that those skilled in the art may combine various elements of these various embodiments and variations without showing any inventive step. Indeed, although examples of enzymes capable of catalyzing the reduction of oxygen at the cathode have been described, it should be clear that the enzyme present at the cathode may be capable of catalyzing another type of oxidizer. It for example is the Horseradish Peroxidase enzyme, which is capable of catalyzing the reduction of hydrogen peroxide (H2O2).

The invention claimed is:

1. A supercapacitor intended to be immersed in a medium containing a biological material and an oxidizer, wherein the anode comprises a first enzyme capable of catalyzing the oxidation of the biological material and the cathode comprises a second enzyme capable of catalyzing the reduction of the oxidizer, and wherein each of the anode and cathode electrodes is formed of a solid cluster of a conductive material mixed with the first or with the second enzyme, said cluster having a specific surface area greater than or equal to 20 m$^2$/g and an average pore size ranging from 0.7 nm to 10 μm.

2. The supercapacitor of claim 1, wherein the conductive material is selected from the group comprising carbon nanotubes, graphene sheets, and a mixture thereof.

3. The supercapacitor of claim 1, wherein the biological material is a sugar and wherein the first enzyme is selected from the group comprising the glucose oxidase enzyme, the lactose oxidase enzyme, the galactose oxidase enzyme, the fructose oxidase enzyme, the glucose dehydrogenase enzyme, and a mixture thereof.

4. The supercapacitor of claim 1, wherein the second enzyme is selected from the group comprising the polyphenol oxidase enzyme (PPO), the laccase enzyme, the bilirubin oxidase enzyme, and a mixture thereof.

5. The supercapacitor of claim 1, wherein the anode further comprises a first redox mediator capable of exchanging electrons with the first enzyme.

6. The supercapacitor of claim 5, wherein the first mediator is selected from the group comprising ubiquinone, ferrocene, cobaltocene, N-methyl phenothiazine, 8-hydroxyquinoline-5-sulfonic acid hydrate (HQS), and a mixture thereof.

7. The supercapacitor of claim 1, wherein the cathode further comprises a second redox mediator capable of exchanging electrons with the second enzyme.

8. The supercapacitor of claim 7, wherein the second mediator is selected from the group comprising quinone, ABTS, osmocene, ruthenocene, cobalt(II) tetraphenylporphyrin, zinc phtalocyanine, and a mixture thereof.

9. The supercapacitor of claim 1, wherein each cluster of the anode and of the cathode is attached to an electrode wire.

10. The supercapacitor of claim 1, wherein the anode and cathode electrodes are each surrounded with a semipermeable membrane which lets through the oxidizer and the biological material and which does not let through the first and second enzymes.

11. The supercapacitor of claim 1, wherein the anode and cathode electrodes are altogether surrounded with a semipermeable membrane which lets through the biological material and the oxidizer and which does not let through the first and second enzymes.

12. A method of manufacturing a supercapacitor, wherein the anode and the cathode are formed by compression of a dissolved mixture comprising a conductive material associated with a first or a second enzyme to form a solid cluster of the conductive material mixed with the first or with the second enzyme, said cluster having a specific surface area greater than or equal to 20 m$^2$/g and an average pore size ranging from 0.7 nm to 10 μm.

* * * * *